United States Patent
Brunel et al.

(10) Patent No.: US 8,744,342 B2
(45) Date of Patent: Jun. 3, 2014

(54) METHOD AND A DEVICE FOR IDENTIFYING AT LEAST ONE TERMINAL FOR WHICH SIGNALS TRANSFERRED BETWEEN THE AT LEAST ONE TERMINAL AND A BASE STATION HAVE TO BE RELAYED BY A RELAY

(75) Inventors: Loic Brunel, Rennes Cedex (FR);
Damien Castelain, Rennes Cedex (FR);
Nicolas Gresset, Rennes Cedex (FR);
Herve Bonneville, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/996,956

(22) PCT Filed: Jun. 9, 2009

(86) PCT No.: PCT/EP2009/057123
§ 371 (c)(1),
(2), (4) Date: Mar. 1, 2011

(87) PCT Pub. No.: WO2009/150160
PCT Pub. Date: Dec. 17, 2009

(65) Prior Publication Data
US 2011/0306334 A1 Dec. 15, 2011

(30) Foreign Application Priority Data
Jun. 11, 2008 (EP) .................................... 08158040

(51) Int. Cl.
*H04B 1/60* (2006.01)
(52) U.S. Cl.
USPC ............... 455/9; 455/24; 455/557; 370/315; 370/492
(58) Field of Classification Search
CPC ...... H04W 40/22; H04W 88/04; H04W 52/46
USPC .......................... 370/225–228, 315, 329–333; 455/7–13.1, 450–455
See application file for complete search history.

(56) References Cited

U.S. PATENT DOCUMENTS

| 5,659,879 A | 8/1997 | Dupuy |
| 2004/0102219 A1 * | 5/2004 | Bunton et al. ................ 455/560 |

(Continued)

FOREIGN PATENT DOCUMENTS

| EP | 1 898 562 | 3/2008 |
| WO | WO 2006104105 | * 6/2006 |

OTHER PUBLICATIONS

Esseling, N. et al., "A Forwarding Concept for HiperLAN/2", Elsevier Computer Networks, vol. 37, pp. 25-32 (Sep. 1, 2001).

(Continued)

*Primary Examiner* — Rafael Pérez-Gutiérrez
*Assistant Examiner* — Keith Fang
(74) *Attorney, Agent, or Firm* — Oblon, Spivak, McClelland, Maier & Neustadt, L.L.P.

(57) ABSTRACT

A method for identifying at least one terminal for which signals transferred between the at least one terminal and a base station of a wireless cellular telecommunication network have to be relayed by a relay, the base station providing a random access channel enabling a terminal to notify to the base station the presence of the terminal by transferring a random access signal to the base station. The relay device transfers the random access signal to the base station, receives the list, identifies, from the received list, at least one terminal for which signals transferred between the at least one identified terminal and the base station have to be relayed by the relay, and relays signals between the at least one identified terminal and the base station.

19 Claims, 8 Drawing Sheets

(56) References Cited

U.S. PATENT DOCUMENTS

| | | |
|---|---|---|
| 2005/0170782 A1* | 8/2005 | Rong et al. .................. 455/67.11 |
| 2008/0013459 A1* | 1/2008 | Do et al. ........................ 370/248 |
| 2008/0062907 A1 | 3/2008 | Hart et al. |
| 2008/0186950 A1* | 8/2008 | Zhu et al. ....................... 370/350 |
| 2008/0220799 A1* | 9/2008 | Tsai et al. ...................... 455/509 |
| 2009/0047898 A1* | 2/2009 | Imamura et al. .................. 455/7 |
| 2011/0222428 A1* | 9/2011 | Charbit et al. ................. 370/252 |

OTHER PUBLICATIONS

International Search Report Issued Sep. 10, 2009 in PCT/EP09/057123 filed Jun. 9, 2009.

U.S. Appl. No. 12/997,367, filed Dec. 10, 2010, Brunel, et al.

\* cited by examiner

METHOD AND A DEVICE FOR IDENTIFYING AT LEAST ONE TERMINAL FOR WHICH SIGNALS TRANSFERRED BETWEEN THE AT LEAST ONE TERMINAL AND A BASE STATION HAVE TO BE RELAYED BY A RELAY

BACKGROUND (1) Field

The present invention relates generally to a method and a device for identifying at least one terminal for which signals transferred between the at least one terminal and a base station of a wireless cellular telecommunication network have to be relayed by a relay.

(2) Description of the Related Art

Future wireless cellular telecommunication network will use higher frequency bands than the ones used by current wireless cellular telecommunication networks.

New wireless cellular telecommunication networks, particularly in urban environment, will have dead zones, wherein the signals transferred between base stations and terminals will be highly attenuated.

By installing relays, it is possible to reduce the dead zones.

If it is not correctly controlled, the deployment of relays in a wireless cellular telecommunication network may degrade the overall system performance instead of enhancing it.

Indeed, for a given cell, relays of other cells are potential new sources of interference for the given cell. These new sources of interferences are added to the interference generated by other base stations.

The massive deployment of relays will put a heavy burden for operators as they will have to connect these relays to the telecommunication network which links the base stations.

Having relays wired-connected to the telecommunication network increases the relay deployment cost and forbid the relays from being easily changed of location.

BRIEF SUMMARY

The present invention aims at proposing a solution to reduce the dead zones by the deployment of relays which don't have to be wired-connected to telecommunication networks and for which the relaying operation mode is controlled.

To that end, the present invention concerns a method, implemented on a communication system, for identifying at least one terminal for which signals transferred between the at least one terminal and a base station of a wireless cellular telecommunication network have to be relayed by a relay device, the base station providing a random access channel enabling a terminal to notify to the base station the presence of the terminal by transferring a random access signal to the base station, the method comprising:

transferring, by the relay device, a random access signal to the base station over the random access channel to notify the base station of the presence of the relay device, wherein the relay device is initially considered by the base station to be a new terminal in an area managed by the base station after receiving the random access signal;

informing, by the relay device, the base station, after a response to the transferred random access signal is received, that the relay device is a relay that is configured to relay signals between the base station and at least one terminal, for authentication as the relay that is configured to relay signal between the base station and at least one terminal by a core network device;

relaying, by the relay device, signals between at least one terminal and the base station.

The present invention also concerns a method, implemented on a communication system, for notifying the presence of a relay device to a base station, the relay device being able to relay signals transferred between at least one terminal and the base station of a wireless cellular telecommunication network, the base station providing a random access channel enabling a terminal to notify to the base station the presence of the terminal by transferring a random access signal to the base station, the method comprising:

transferring, by the relay device, a random access signal to the base station over the random access channel to notify the base station of the presence of the relay device, wherein the relay device is initially considered by the base station to be a new terminal in an area managed by the base station after receiving the random access signal; and informing, by the relay device, the base station, after a response to the transferred random access signal is received, that the relay device is a relay that is configured to relay signals between the base station and at least one terminal, for authentication as the relay that is configured to relay signals between the base station and at least one terminal by a core network device.

The present invention also concerns a method, implemented on a communication system, for notifying the presence of a relay device to a base station, the relay device being able to relay signals transferred between at least one terminal and the base station of a wireless cellular telecommunication network, the base station providing a random access channel enabling a terminal to notify to the base station the presence of the terminal by transferring a random access signal to the base station, the method comprising:

receiving, by the base station, a random access signal from the relay device over the random access channel to notify the base station of the presence of the relay device, wherein the relay device is initially considered by the base station to be a new terminal in an area managed by the base station after receiving the random access signal; and receiving, by the base station, after a response to the transferred random access signal is transferred, information from the relay device notifying that the relay device is a relay that is configured to relay signals between the base station and at least one terminal, for authentication as the relay that is configured to relay signals between the base station and at least one terminal by a core network device.

The present invention also concerns a relay device of a wireless cellular telecommunication network in which the relay device is configured to relay signals transferred between at least one terminal and a base station, and the base station provides a random access channel enabling a terminal to notify to the base station the presence of the terminal by transferring a random access signal to the base station, the relay device comprising:

means for transferring a random access signal to the base station over the random access channel to notify the base station of the presence of the relay device, wherein the relay device is initially considered by the base station to be a new terminal in an area managed by the base station after receiving the random access signal, means for informing the base station, after a response to the transferred random access signal is received, that the relay device is the relay that is configured to relay signals between the base station and at least one terminal, for authentication as the relay that is configured to relay signals between the base station and at least one terminal by a core network device; and means for relaying signals between at least terminal and the base station.

Thus, it is no more necessary to wire-connect the relay to the telecommunication network of the wireless cellular telecommunication network.

By using a signal classically used by terminals, the relay can establish a connection with the wireless cellular telecommunication network without needing any particular modification of the wireless cellular telecommunication network.

Furthermore, by determining at least one terminal for which signals have to be relayed, it is possible to adapt the operation of the relay to the conditions of the wireless cellular telecommunication network. As the signals relayed are controlled, less interference on neighbouring cells is generated.

Furthermore, as the relay uses the same signaling as terminals, the relay can move.

According to a particular feature, the relay device:
receives a message requesting the relay device to switch in an idle mode,
interrupts the relay of the signals transferred between each identified terminal and the base station.

Thus, the operation of the relay is adapted to the conditions of the wireless cellular telecommunication network. As the signals relayed are controlled, less interference on neighbouring cells is generated.

According to a particular feature, the relay device, prior to receiving the message, transfers information representative of measurement of signals transferred by at least one terminal to the base station which handles the terminal.

Thus, it is possible to know which terminals may be good candidates for the list of at least one terminal. The operation of the relay is adapted to the conditions of the wireless cellular telecommunication network.

According to a particular feature, information representative of measurement of signals transferred by at least one terminal are information identifying the resource blocks of at least one channel between the base station and the terminal for which the relay device measures the highest received signal power strength.

Thus, it is possible to know which resource blocks may be good candidates for the relaying of signals. The operation of the relay is adapted to the conditions of the wireless cellular telecommunication network.

According to a particular feature, a management entity manages the relay device located in the area managed by the base station.

According to a particular feature, the relay device receives a list, identifies from the received list at least one terminal for which signals transferred between the at least one identified terminal and the base station have to be relayed by the relay device, and
the management entity:
receives the information identifying the resource blocks,
obtains, from the base station, at least one identifier of the terminal to which the identified resource blocks are allocated,
determines, from the at least one obtained identifier of terminal, the list of at least one terminal.

Thus, it is possible to know which terminals may be good candidates. The operation of the relay is adapted to the conditions of the wireless cellular telecommunication network.

Furthermore, as the relay does not need to identify the terminals during measurements, the wireless cellular telecommunication does not need to be modified a lot.

According to a particular feature, the management entity obtains, from the base station, at least one identifier of the terminal for which the transmission quality between the terminal and the base station is below a given threshold and the list of at least one terminal is further determined from the at least one obtained identifier of terminal for which the transmission quality between the terminal and the base station is below the given threshold.

Thus, it is possible to know which terminals may be good candidates. The operation of the relay is adapted to the conditions of the wireless cellular telecommunication network.

According to a particular feature, the relay device receives a list, identifies from the received list at least one terminal for which signals transferred between the at least one identified terminal and the base station have to be relayed by the relay device, and the management entity receives information representative of measurement of signals transferred between the base station and the relay, and the list of at least one terminal is further determined from information representative of measurement of signals transferred between the base station and the relay.

Thus, it is possible to determine if the relay is a good candidate for relaying signals transferred between the base station and at least one terminal. For example, if the relay is moving and the link conditions between the relay and the base station decrease, the relay should not relay signals and the management entity may select another relay for relaying signals transferred between the base station and the terminal.

According to a particular feature, the management entity transfers a message requesting the relay device to stop to transfer signals transferred between the at least one terminal and the base station which handles the terminal if signals don't need to be relayed.

Thus, the operation of the relay is adapted to the conditions of the wireless cellular telecommunication network.

According to a particular feature, the management entity transfers a paging message to the relay device.

Thus, by using a signal classically used for terminals, the management entity can wake up the relay and/or determine the location of the relay without needing any particular modification of the wireless cellular telecommunication network.

According to a particular feature, the message and/or the information transferred between the management entity and the relay device are transferred via a radio interface of the base station.

Thus, by using the resource of the base station, there is no need to modify the architecture of the wireless cellular telecommunication network.

According to a particular feature, the base station allocates an identifier to the relay device, the identifier being selected among identifiers to be allocated to terminals.

Thus, as the base station does not need to be aware of the relaying characteristic, by using classical identifier normally used for terminal, the base station does not need to be modified and the relay can be identified. There is no need of particular modifications of the wireless cellular telecommunication network.

According to a particular feature, the relay device receives a list, identifies from the received list at least one terminal for which signals transferred between the at least one identified terminal and the base station have to be relayed by the relay device, and the at least one identified terminal is identified in the received list.

According to still another aspect, the present invention concerns a non-transitory computer readable medium including computer executable instructions or portions of code for causing a relay device of a wireless cellular telecommunication network, in which the relay device is configured to relay signals transferred between at least one terminal and a base station and the base station provides a random access channel enabling a terminal to notify to the base station the presence of the terminal by transferring a random access signal to the base station, to perform a method comprising:

transferring, by the relay device, a random access signal to the base station over the random access channel to notify the base station of the presence of the relay device, wherein the relay device is initially considered by the base station to be a new terminal in an area managed by the base station after receiving the random access signal;

informing, by the relay device, the base station, after a response to the transferred random access signal is received, that the relay device is a relay that is configured to relay signals between the base station and at least one terminal, for authentication as the relay that is configured to relay signals between the base station and at least one terminal by a core network device; and relaying, by the relay device, signals between at least one terminal and the base station.

Since the features and advantages relating to the computer program are the same as those set out above related to the method and device according to the invention, they will not be repeated here.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION

Figure 1:
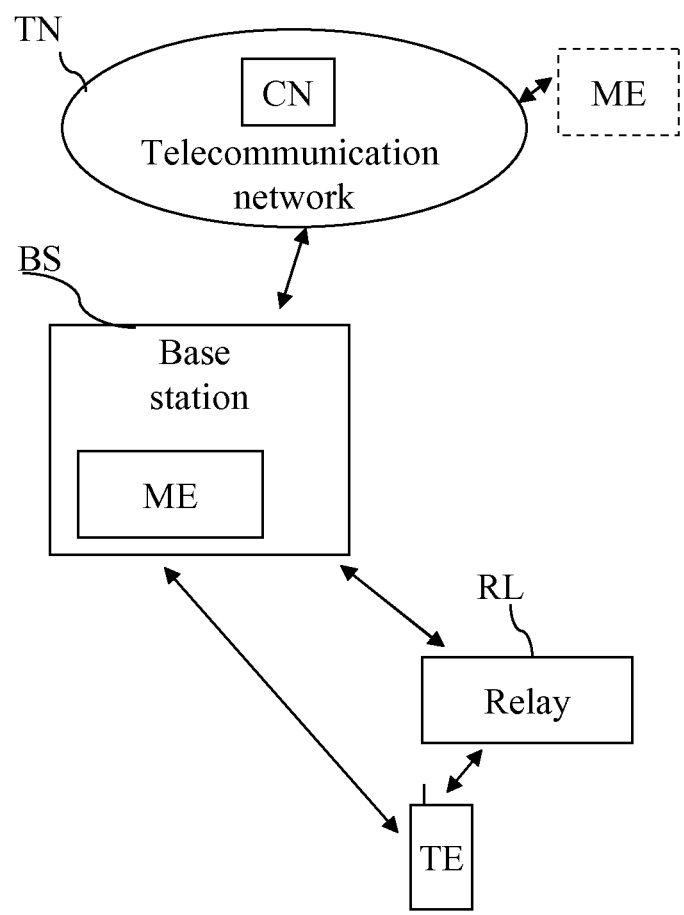
FIG. 1 represents the architecture of a wireless cellular telecommunication network in which the present invention is implemented.

FIG. 1 represents the architecture of a wireless cellular telecommunication network in which the present invention is implemented.

In the wireless cellular telecommunication network, a base station BS transfers signals to at least one terminal TE.

The base station BS is also named an access node or a node B or an enhanced node B.

A base station BS handles a terminal TE when the base station BS has the information necessary for enabling the terminal TE to establish a communication with a remote device through the base station BS.

An area or a cell managed by a base station BS is an area in which the base station BS and a terminal TE in the cell can communicate.

The base station BS transfers signals to the terminal TE through a downlink channel and receives signals transferred by the terminal TE through an uplink channel.

In the FIG. 1, one relay RL is shown. The relay RL may work into three modes. A relay mode wherein the relay RL relays signals transferred between the base station BS and at least one terminal TE, an idle mode wherein the relay RL is in an idle mode as the idle mode known for terminals TE of classical wireless cellular telecommunication networks and an active mode wherein a connection is established between the relay RL and a management entity ME but wherein the relay doesn't not relay signals transferred between the base station BS and at least one terminal TE. The active mode is an intermediate mode between the relay mode and the idle mode.

The idle mode is a mode wherein no connection is established between the relay RL and a management entity ME, wherein the relay RL doesn't relay any signal transferred between the base station BS and at least one terminal TE and doesn't transfer signals enabling the determination of position of the relay to any other device of the wireless cellular telecommunication network.

According to the invention, the position of the relay RL may vary. For example, the relay RL may be located in a bus, a car, or a train.

According to the invention, the relay RL transfers a random access signal to the base station BS for obtaining a list of at least one terminal TE.

The relay RL identifies, from the received list, at least one terminal TE for which signals transferred between the at least one identified terminal TE and the base station BS have to be relayed by the relay RL.

The random access signal is as the one transferred by a terminal TE in a random access channel in order, for the base station BS, to detect the presence of the terminal TE.

When the relay RL acts as a relay, it receives signals transferred by the base station BS which handles the terminal TE in the downlink channel and transfers these signals to the terminal TE through the downlink channel and/or receives signals transferred by the terminal TE through the uplink channel and transfers these signals in the uplink channel to the base station BS which handles the terminal TE.

It has to be noted here that the relay RL may also operate into other different modes. For example, the relay RL may operate like a femto base station.

The base station BS is linked to a telecommunication network TN which links each base station BS to core network devices CN which handle the operation of the wireless cellular telecommunication network.

The core network devices CN execute the same operation as classical core network devices in classical wireless cellular telecommunication networks.

In FIG. 1, one management entity ME is shown. The management entity ME is included in at least one base station BS and manages one relay RL or plural relays RL included into at least one cell of the base station BS.

In a variant, the management entity ME is not included in the base station BS and manages plural relays RL included into the cells of plural base stations BS linked to the management entity ME through the telecommunication network TN.

Some of the relays RL may work in the relay mode, others in the idle or active mode.

The management entity ME may be also named a relay controller.

In the FIG. 1, only one base station BS, one management entity ME and one relay RL are shown for the sake of clarity but in practice the wireless cellular telecommunication network comprises a large number of base stations BS, management entities ME and relays RL.

The terminal TE is, for example, a mobile phone, a personal digital assistant, a personal computer.

In FIG. 1, only one terminal TE is shown for the sake of clarity but in practice the wireless cellular telecommunication network comprises a large number of terminals TE.

Figure 2:
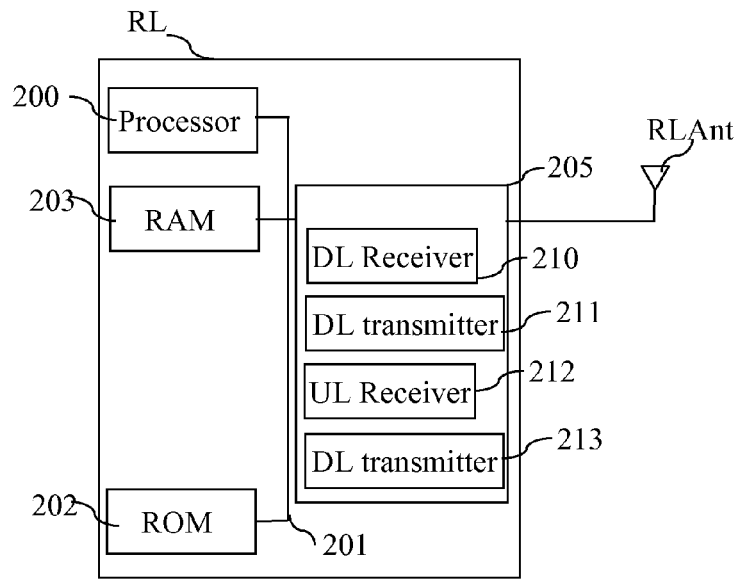
FIG. 2 is a diagram representing the architecture of a relay in which the present invention is implemented.

FIG. 2 is a diagram representing the architecture of a relay in which the present invention is implemented.

The relay RL has, for example, an architecture based on components connected together by a bus 201 and a processor 200 controlled by the program as disclosed in the FIG. 5.

The bus 201 links the processor 200 to a read only memory ROM 202, a random access memory RAM 203 and a wireless interface 205.

The memory 203 contains registers intended to receive variables and the instructions of the program as disclosed in the FIG. 5.

The processor 200 controls the operation of the wireless interface 205.

The read only memory 202 contains instructions of the program as disclosed in the FIG. 5, which are transferred, when the relay RL is powered on to the random access memory 203.

The wireless interface 205 enables the relay RL to transfer and/or receive signals or messages to the base station BS and to the at least one terminal TE included in the list of at least one terminal TE.

The wireless interface 205 may comprise a downlink reception module 210 which receives signals transferred by at least one base station BS, may comprise a downlink transmission module 211 which transfers signals to at least one terminal TE, may comprise an uplink reception module 212 which receives signals transferred by at least one terminal TE and may comprise an uplink transmission module 213 which transfer signals to at least one base station BS.

Figure 3:
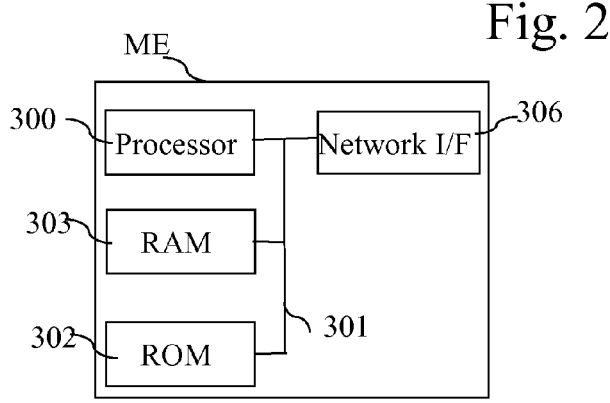
FIG. 3 is a diagram representing the architecture of a management entity in which the present invention is implemented.

FIG. 3 is a diagram representing the architecture of a management entity in which the present invention is implemented.

The management entity ME has, for example, an architecture based on components connected together by a bus 301 and a processor 300 controlled by the program as disclosed in the FIG. 7.

The bus 301 links the processor 300 to a read only memory ROM 302, a random access memory RAM 303 and a network interface 306.

The memory 303 contains registers intended to receive variables and the instructions of the program related to the algorithm as disclosed in the FIG. 7.

The processor 300 controls the operation of the network interface 306.

The read only memory 302 contains instructions of the programs related to the algorithm as disclosed in the FIG. 7, which are transferred, when the management entity ME is powered on to the random access memory 303.

The management entity ME may be connected to the telecommunication network TN through the network interface 306. For example, the network interface 306 is a DSL (Digital Subscriber Line) modem, or an ISDN (Integrated Services Digital Network) interface, etc. Through such interface, the management entity ME may transfer messages to at least one relay RL and/or to at least one base station BS and/or receive message from at least one relay RL and/or from at least one base station BS.

It has to be noted here that, when the management entity ME is included in a base station BS, the processor 300, the memory 302, the random access memory RAM 303 and the network interface 306 may be the ones of the base station BS.

Figure 4:
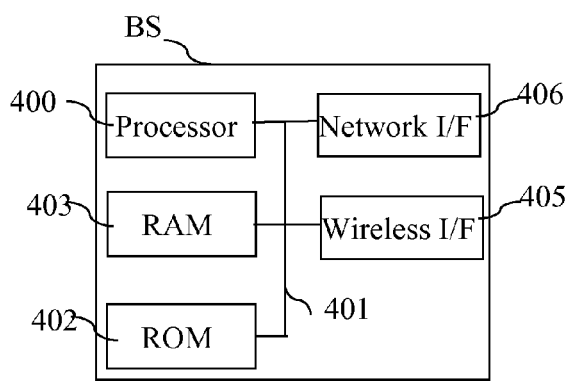
FIG. 4 is a diagram representing the architecture of a base station in which the present invention is implemented.

FIG. 4 is a diagram representing the architecture of a base station in which the present invention is implemented.

Figure 6:
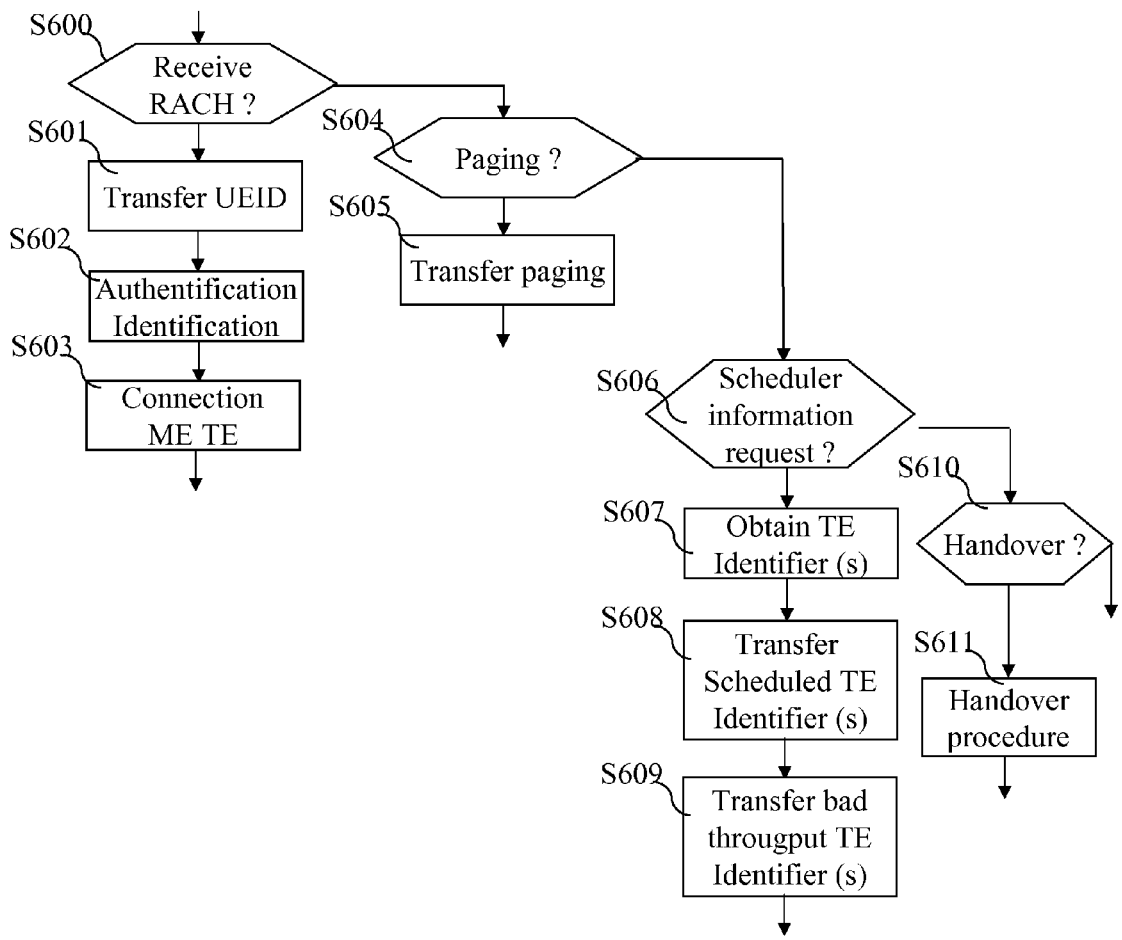
FIG. 6 discloses an example of an algorithm executed by the base station according to the present invention.

The base station BS has, for example, an architecture based on components connected together by a bus 401 and a processor 400 controlled by the program as disclosed in the FIG. 6.

The bus 401 links the processor 400 to a read only memory ROM 402, a random access memory RAM 403, a wireless interface 405 and a network interface 406.

The memory 403 contains registers intended to receive variables and the instructions of the program related to the algorithm as disclosed in the FIG. 6.

The processor 400 controls the operation of the network interface 406 and of the wireless interface 405.

The read only memory 402 contains instructions of the programs related to the algorithm as disclosed in the FIG. 6, which are transferred, when the base station BS is powered on to the random access memory 403.

The base station BS is connected to the telecommunication network TN through the network interface 406. For example, the network interface 406 is a DSL (Digital Subscriber Line) modem, or an ISDN (Integrated Services Digital Network) interface, etc. Through such interface, the base station BS may transfer messages to at least one management entity ME or to core network devices CN which manage the wireless cellular telecommunication network.

The wireless interface 405 comprises at least a downlink transmission module not shown in the FIG. 1 which transfers signals to at least one terminal TE relayed or not by the relay RL and an uplink reception module not shown in the FIG. 1 which receives signals transferred by at least one terminal TE, relayed or not by the relay RL.

Figure 5A:
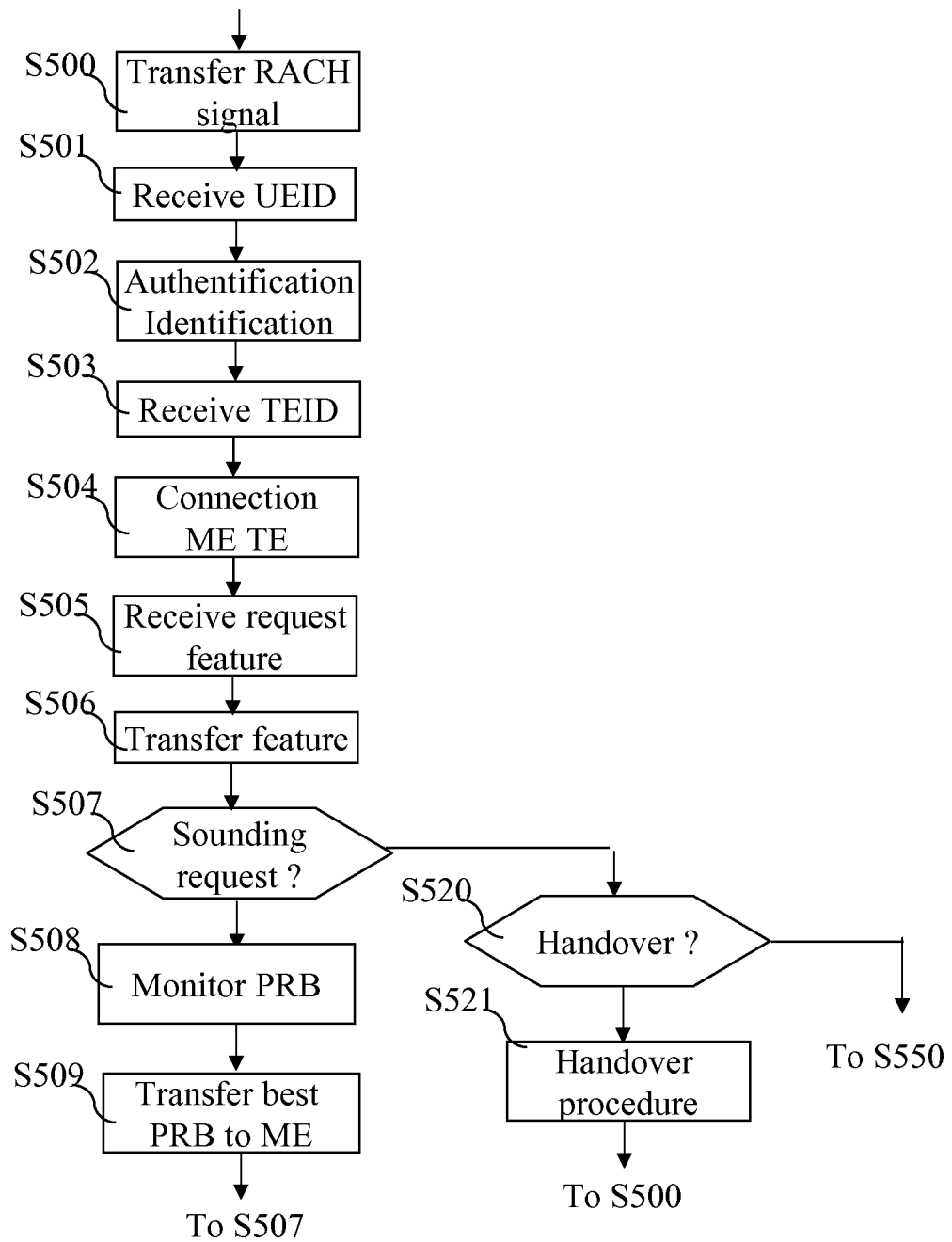
FIGS. 5a and 5b disclose an example of an algorithm executed by the relay according to the present invention.
Figure 5B:
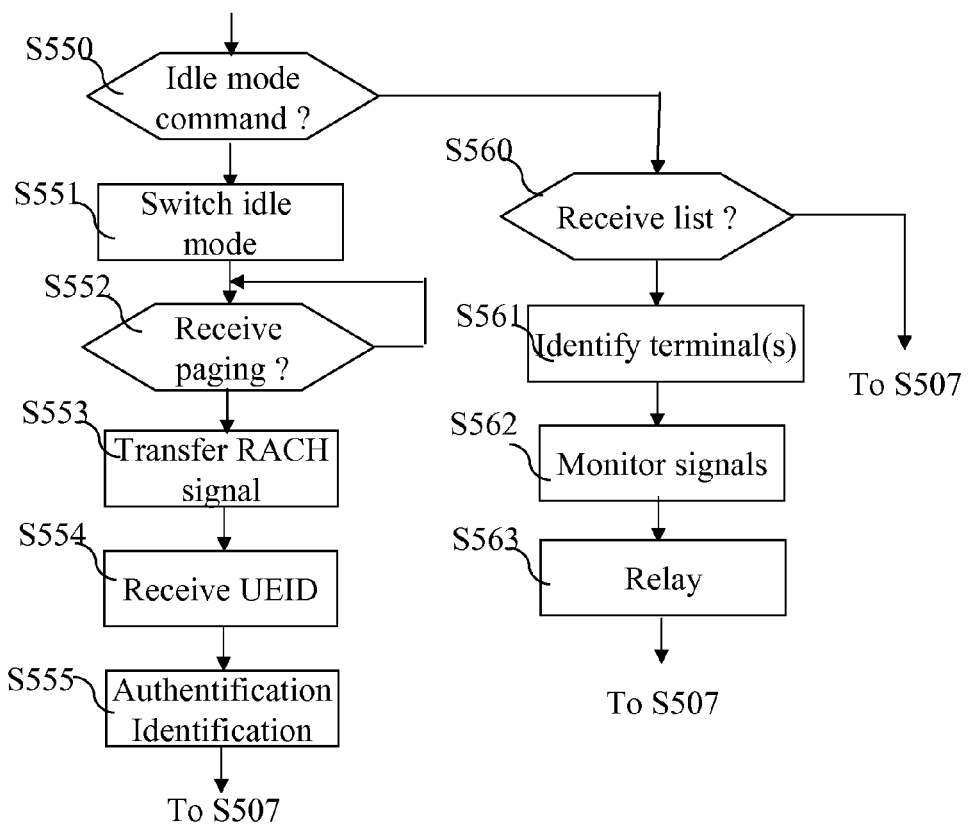

FIGS. 5a and 5b disclose an example of an algorithm executed by the relay according to the present invention.

More precisely, the present algorithm is executed by the processor 200 of the relay RL.

At step S500 of the FIG. 5a, the processor 200 commands the wireless interface 205 to transfer a random access signal RACH through a random access channel of a base station BS which manages the cell in which the relay RL is located.

The random access signal is transferred for example when the relay RL is powered on or when the relay RL enters in an area unknown by the relay RL.

At next step S501, the processor 200 receives, through the wireless interface 205, a temporary identifier UEID allocated by the base station BS to the relay RL. The temporary identifier UEID uniquely identifies the relay RL in the cell managed by the base station BS. The identifier UEID, which uniquely identifies the relay RL, is selected among plural identifiers which may uniquely identify a terminal TE located in the cell managed by the base station BS.

It has to be noted here that, as the relay RL uses the same random access signal RACH used by a terminal TE for notifying its presence in the cell of the base station BS, the relay RS is considered to be a new terminal TE in the cell of the base station BS.

At next step S502, the processor 200 enters into an identification/authentication procedure with at least one core network device CN of the wireless cellular telecommunication network.

At that step, the processor 200 informs the core network device CN or the base station BS that the relay RL is not a terminal TE but a relay which may, in a relay operation mode, relay signals transferred between the base station BS and at least one terminal TE.

At the same time, the relay RL is authenticated in a similar way as a classical wireless cellular telecommunication network authenticates a terminal TE.

At next step S503, the processor 200 receives through the wireless interface 205, a unique identifier TEID from a core network device CN of the wireless cellular telecommunication network.

The unique identifier TEID uniquely identifies the relay RL in the wireless cellular telecommunication network or uniquely identifies the relay RL in a group of cells of the wireless cellular telecommunication network. The identifier TEID, which uniquely identifies the relay RL, is selected among plural identifiers which may uniquely identify a terminal TE in the wireless cellular telecommunication network or in a group of cells of the wireless cellular telecommunication network.

It has to be noted here that, the order of the reception of the UEID and TEID may be different as the one disclosed in the present algorithm.

At next step S504, a connection is established between the relay RL and the management entity ME.

When the management entity ME is included in the base station BS, the connection between the relay RL and the management entity ME is established between the relay RL and the base station BS through their respective wireless interfaces 205 and 405.

When the management entity ME is not included in the base station BS, the connection between the relay RL and the management entity ME is decomposed into a first sub-connection established between the relay RL and the base station BS through their respective wireless interfaces 205 and 405 and into a second sub-connection between the base station BS and the management entity ME through their respective network interfaces 406 and 306.

At the same step, the management entity ME memorizes the couple of UEID and TEID allocated to the relay RL. The management entity ME may initiate the connection using the couple of unique identifiers or the relay RL may initiate the connection from indication provided by the core network device CN of the wireless cellular telecommunication network.

At next step S505, the processor 200 detects the reception through the wireless interface 205 of a request for obtaining the features of the relay RL.

The features of the relay RL are for example, the position of the relay as the one provided by a Global Navigation Satellite System, if the relay is able to schedule or not the retransmission of the received signals and/or if the relay is able to decode and retransmit the received signals and/or if the relay is able to determine to which terminal TE signals are transferred or from which terminal TE signal are transmitted and/or if the relay RL is able to retransmit signals onto different frequency resources or is able to retransmit signals using different modulation and/or coding scheme than the one used for the transmission of the signals received by the relay RL and/or which protocol is supported by the relay RL.

At next step S506, the processor 200 commands the transfer through the wireless interface 205 of the features of the relay RL.

It has to be noted here that in a variant, the features of the relay RL are transferred during the identification step S502. In that variant, the processor 200 moves from step S504 to step S507.

In another variant, once the connection is established at step S504, the processor 200 moves from step S504 to S506 and commands the transfer through the wireless interface 205 of the features of the relay RL.

At next step S507, the processor 200 checks if a sounding request is received through the wireless interface 205. The sounding request is transferred by the management entity ME.

If a sounding request is received, the processor 200 moves to step S508. Otherwise, the processor 200 moves to step S520.

At next step S508, the processor 200 commands the wireless interface 205 to sound received signals i.e. to monitor the signals received in each radio Physical Resource Block PRB.

A Physical Resource Block is a part of the downlink channel and/or of the uplink channel. A Physical Resource Block is composed of at least one time and/or frequency resource of the downlink channel and/or of the uplink channel.

For example, the power strengths of the signals transmitted by the terminals TE and received by the relay RL in each radio Physical Resource Block are monitored and/or the power strengths of the signals transmitted by the base station BS and received at the relay in each radio Physical Resource Block are monitored.

At next step S509, the processor 200 commands the wireless interface 205 to transfer to the management entity ME, information identifying the M Physical Resource Blocks PRB on which the received signals power strength are the M highest, M being an integer at least equal to one.

In a variant, the processor 200 commands the wireless interface 205 to determine the terminals TE which transfer the signals having the M highest received signals power strength and to transfer the M identifiers of the determined terminals TE.

After that, the processor 200 returns to step S507.

At step S520, the processor 200 checks if a handover command message is received through the wireless interface 205.

If a handover request message is received, the processor 200 moves to step S521. Otherwise, the processor 200 moves to step S550 of the FIG. 5b.

At step S521, the relay RL executes a handover procedure as a classical terminal TE executes a handover in a classical wireless cellular telecommunication network.

After that, the processor 200 returns to step S500.

At step S550, the processor 200 checks if an idle command is received through the wireless interface 205 from the management entity ME.

If an idle command is received, the processor 200 moves to step S551. Otherwise, the processor 200 moves to step S560.

At step S551, the processor 200 commands the wireless interface 205 to switch to the idle mode. The wireless interface 205 stops to relay signals and interrupts the transmission of some signals like the ones used for localizing a terminal TE.

At step S552, the processor 200 waits the reception, through the wireless interface 205, of a paging message issued by the management entity ME. A paging message is classically used by the core network devices CN in order to inform a terminal TE that there is an incoming call for it.

When a paging message is received, the processor 200 moves to step S553.

At step S553, the processor 200 commands the transfer of the random access signal RACH through the random access channel of the base station BS which manages the area in which the relay RL is located.

The random access signal is transferred in response to the received paging message.

At next step S554, the processor 200 receives through the wireless interface 206, another temporary identifier UEID allocated to the relay RL by the base station BS. The temporary identifier UEID uniquely identifies the relay RL in the cell managed by the base station BS. The temporary identifier UEID which uniquely identifies the relay RL is selected among plural temporary identifiers which may uniquely identify a terminal TE located in the cell managed by the base station BS.

At next step S555, the processor 200 enters into an identification/authentication procedure with the management device ME as it has been disclosed at step S502 of the FIG. 5a.

After that, the processor 200 returns to step S507 of the FIG. 5a.

At step S560, the processor 200 checks if a list of at least one terminal TE is received through the wireless interface 205.

If a list of at least one terminal TE is received, the processor 200 moves to step S561. If no list of at least one terminal TE is received, the processor 200 returns to step S507 of the FIG. 5a.

At step S561, the processor 200 identifies, from the received list of at least one terminal TE, at least one terminal TE for which signals transferred between the at least one identified terminal TE and the base station BS have to be relayed by the relay RL.

For example, the list of at least one terminal TE comprises the identifier of each terminal TE for which signals transferred between the base station BS and the terminal TE have to be relayed.

The processor 200 identifies the at least one terminal TE for which signals transferred between the at least one identified terminal TE and the base station BS have to be relayed by the relay RL by reading the identifiers comprised in the list of at least one identifier.

For example, the list of at least one terminal TE comprises the identifier of each new terminal TE for which signals transferred between the base station BS and the terminal TE have to be relayed.

The processor 200 identifies the at least one terminal TE for which signals transferred between the at least one identified terminal TE and the base station BS have to be relayed by the relay RL by adding each identifier comprised in the received list of at least one identifier to a memorized list of terminal TE for which signals transferred between the at least one identified terminal TE and the base station BS had to be relayed by the relay RL.

For example, the list of at least one terminal TE comprises the identifier of each terminal TE for which the relaying of signals transferred between the base station BS and the terminal TE has to be interrupted.

The processor 200 identifies the at least one terminal TE for which signals transferred between the at least one identified terminal TE and the base station BS have to be relayed by the relay RL by removing each identifier comprised in the received list of at least one identifier to a memorized list of terminal TE for which signals transferred between the at least one identified terminal TE and the base station BS had to be relayed by the relay RL.

At next step S562, the processor 200 commands the wireless interface 205 to monitor, decode and code the signals transferred by the base station BS to each identified terminal TE and/or to monitor, decode and code the signals transferred to the base station BS by each identified terminal TE.

At next step S563, the processor 200 commands the wireless interface 205 to retransmit the monitored decoded and coded signals to the terminal TE and/or to the base station BS.

For example, in a first step, the relay RL receives the signal to/from a terminal TE on a frequency resource allocated to the terminal TE by the Base Station BS and in a second step, the relay RL retransmits on the same frequency resource the received signal without modification of the signal, while the base station BS does not transmit on the frequency resource.

For example, in a first step, the relay RL receives the signal to/from a terminal TE on a frequency resource allocated to the terminal TE by the Base Station BS and in a second step, the relay RL retransmits on the same frequency resource the received signal without modification, while the base station BS transmits another signal to the same terminal TE on the frequency resource.

For example, in a first step, the relay RL receives the signal to/from a terminal TE on a frequency resource allocated to the terminal TE by the Base Station BS and in a second step, the relay RL retransmits on the same frequency resource the received signal without modification, while the base station BS transmits a signal to another terminal TE on the frequency resource.

For example, in a second step, the relay RL receives and decodes the signal of a terminal TE on a frequency resource allocated to the terminal TE by the Base Station BS and in a second step, the relay RL re-encodes and transmits on the same frequency resource the received signal without modification, while the base station BS does not transmit on the frequency resource.

After that, the processor 200 returns to step S507 of the FIG. 5a.

FIG. 6 discloses an example of an algorithm executed by the base station according to the present invention.

More precisely, the present algorithm is executed by the processor 400 of the base station BS.

At step S600, the processor 400 checks if a random access signal RACH is received through the random access channel of the base station BS.

The random access signal RACH is classically transferred by a new terminal TE located in the cell managed by the base station BS or transferred in response to a paging message or when a terminal TE is powered on.

If the random access signal is received, the processor 400 moves to step S601. Otherwise, the processor 400 moves to step S604.

At step S601, the processor 400 commands the transfer through the wireless interface 206, in response to the received random access signal RACH, of a temporary identifier UEID allocated by the base station BS to the supposed terminal TE which sent the RACH signal. The temporary identifier UEID uniquely identifies the supposed terminal TE in the cell managed by the base station BS.

At next step S602, an identification/authentication procedure is established between the supposed terminal TE and at least one core network device CN of the wireless cellular telecommunication network.

At that step, the base station BS becomes aware that the supposed terminal TE is the relay RL.

The base station BS or the core network device CN notifies the management entity ME that a new relay RL is located in the cell managed by the base station BS and transfers to the management entity ME, the UEID and TEID allocated to the terminal TE.

It has to be noted here that in a variant, the relay RL transfers the allocated UEID and TEID to the management entity ME.

At the same time, the relay RL is authenticated in a similar way as a classical wireless cellular telecommunication network authenticates a terminal TE.

At next step S603, a connection is established between the relay RL and the management entity ME.

When the management entity ME is included in the base station BS, the connection between the relay RL and the management entity ME is established between the relay RL and the base station BS through their respective wireless interfaces 205 and 405.

When the management entity ME is included in the base station BS, the connection between the relay RL and the management entity ME is decomposed into a first sub-connection established between the relay RL and the base station BS through their respective wireless interfaces 205 and 405 and into a second sub-connection between the base station BS and the management entity ME through their respective network interfaces 406 and 306.

The management entity ME may initiate the connection using the couple of unique identifiers or the relay RL may initiate the connection from indication provided by the core network devices CN.

After that, the processor 400 returns to step S600.

At step S604, the processor 400 checks if a paging message is received from the management entity ME.

If a paging message is received, the processor 400 moves to step S605. Otherwise, the processor 400 moves to step S606.

At step S605, the processor 400 commands the transfer of the paging message through the wireless interface 405.

After that, the processor 400 returns to step S600.

At step S606, the processor 400 checks if a scheduler information request is received from the management entity ME through the network interface 406.

If a scheduler information request is received, the processor 400 moves to step S607. Otherwise, the processor 400 moves to step S610.

At step S607, the processor 400 obtains the identifiers of the terminals TE to which, the physical resource blocks PRB transmitted during the scheduler information request, have been allocated by the base station BS.

In a variant, the processor 400 obtains identifiers of the terminals TE to which the base station BS has allocated at least one physical resource blocks PRB.

At next step S608, the processor 400 commands the transfer, to the management entity ME, of the identifiers of the terminals TE to which, the physical resource blocks transmitted during the scheduler information request, have been allocated.

In a variant, the processor 400 commands the transfer, to the management entity ME, of the identifiers of the terminals TE to which, at least one physical resource block has been allocated by the base station in combination with information identifying the physical resource blocks.

At next step S609, the processor 400 commands the transfer of the identifiers of the terminals TE handled by the base station BS for which the transmission quality between the terminal TE and the base station BS is below a given threshold.

As example, the transferred identifiers are the identifiers of the terminals TE which are identified as having a low throughput in comparison with others.

These terminals TE are identified, for example, by monitoring the number of retransmission of packets which have been executed over a given period of time.

After that, the processor 400 returns to step S600.

At step S610, the processor 400 checks if a handover is needed.

If a handover is needed, the processor 400 moves to step S611. Otherwise, the processor 400 returns to step S600.

At step S611, the processor 400 executes a handover procedure as for a classical terminal TE in a classical wireless cellular telecommunication network.

After that, the processor 400 returns to step S600.

Figure 7A:
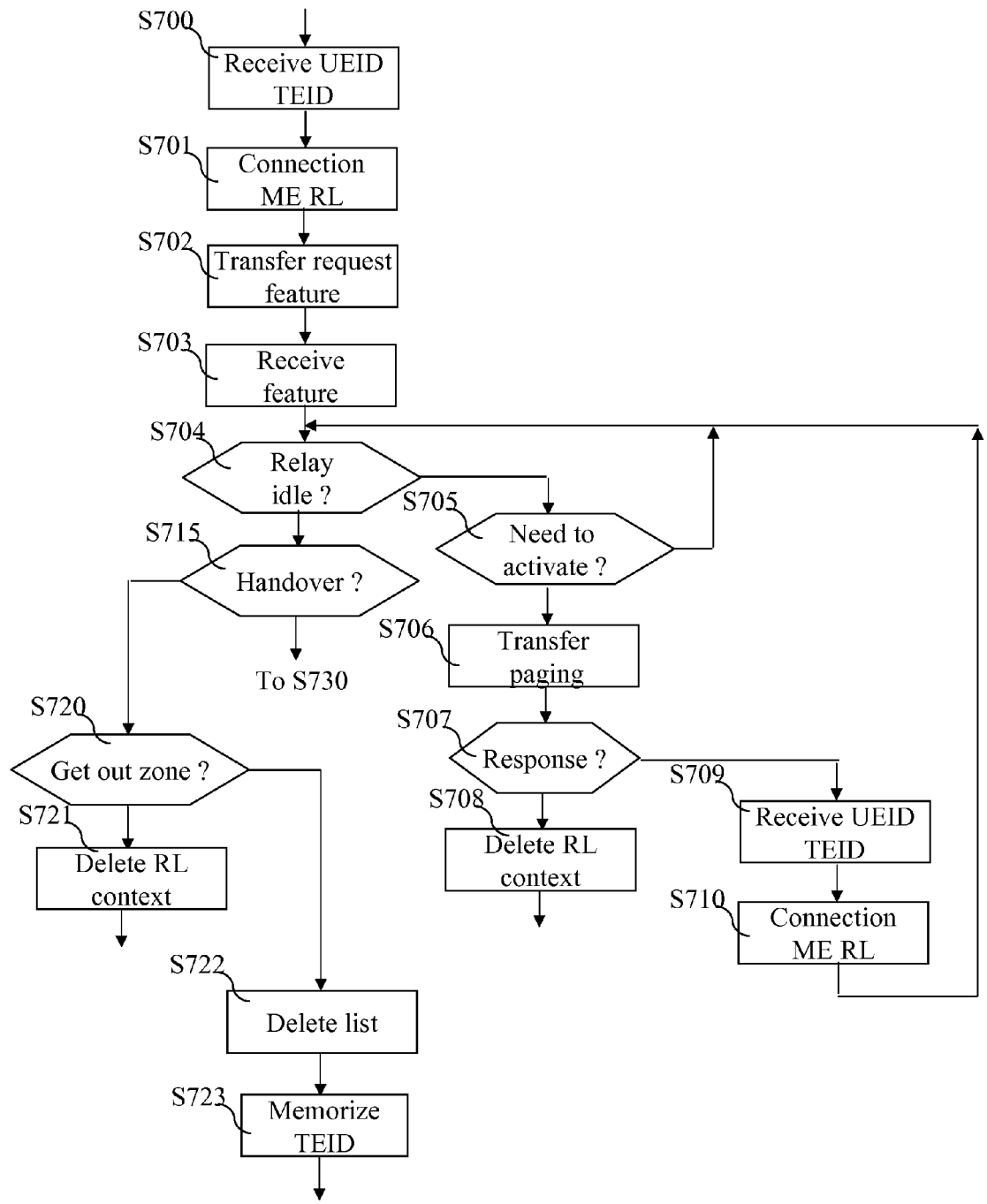
FIGS. 7a, 7b and 7c disclose an example of an algorithm executed by the management entity according to the present invention.
Figure 7B:
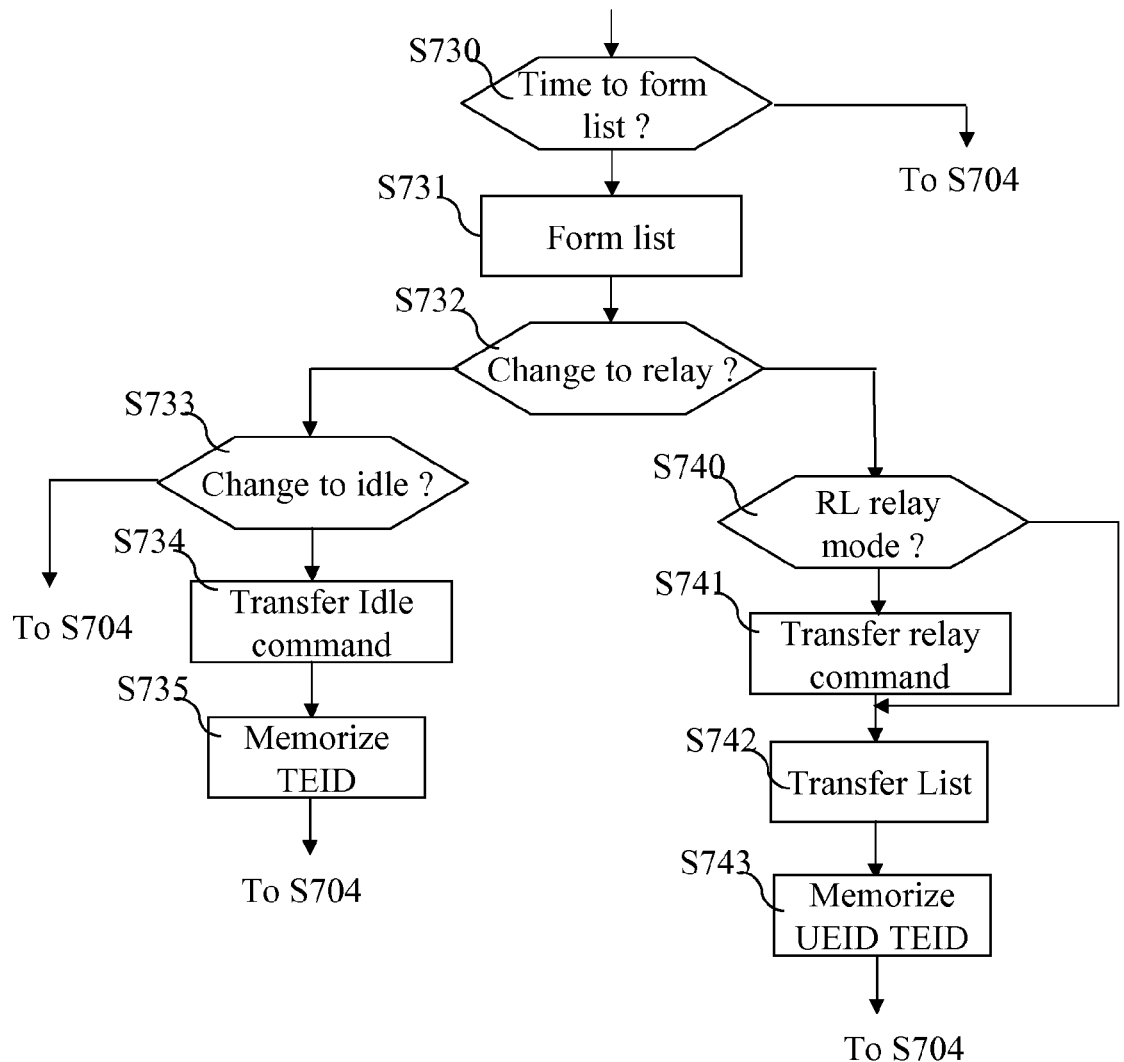
Figure 7C:
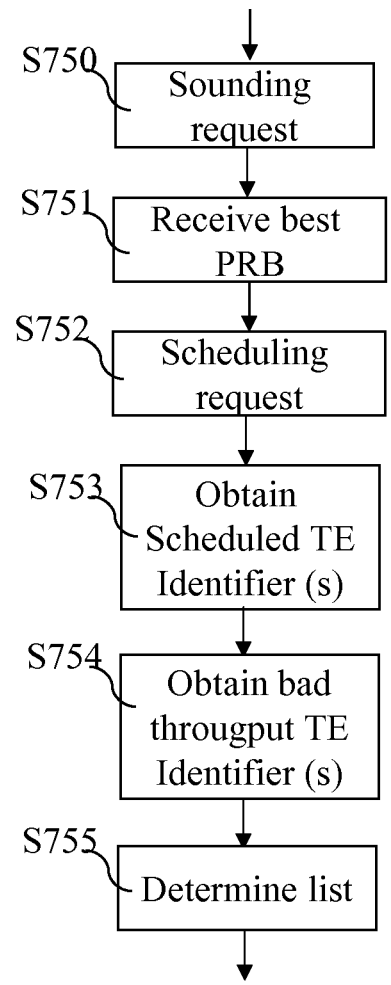

FIGS. 7a, 7b and 7c disclose an example of an algorithm executed by the management entity according to the present invention.

More precisely, the present algorithm is executed by the processor 300 of the management entity ME.

When the management entity ME manages relays RL included into at least one cell of one base station BS, the present algorithm is executed in parallel for each relay RL comprised in the cell of the base station BS.

When the management entity ME manages relays RL included into cells of plural base stations BS, the present algorithm is executed in parallel for each relay RL comprised in the cell of each base station BS.

At step S700, the processor 300 detects the reception of a message comprising the identifiers UEID and TEID allocated to the relay RL. The message is transferred by the base station BS or by the core network CN.

It has to be noted here that in a variant, the relay RL transfers the allocated UEID and TEID to the management entity ME.

At next step S701, a connection is established between the relay RL and the management entity ME.

When the management entity ME is included in the base station BS, the connection between the relay RL and the management entity ME is established between the relay RL and the base station BS through their respective wireless interfaces 205 and 405.

When the management entity ME is included in the base station BS, the connection between the relay RL and the management entity ME is decomposed into a first sub-connection established between the relay RL and the base station BS through their respective wireless interfaces 205 and 405 and into a second sub-connection between the base station BS and the management entity ME through their respective network interfaces 406 and 306.

The management entity ME may initiate the connection using the couple of unique identifiers or the relay RL may initiate the connection from indication provided by the core network CN.

At step S702, the processor 300 commands the transfer of a request for obtaining the features of the relay RL.

The features of the relay RL are for example, the position of the relay as the one provided by a Global Navigation Satellite System, if the relay is able to schedule or not the retransmission of the received signals and/or if the relay is able to decode and retransmit the received signals and/or if the relay is able to determine to which terminal TE signals are transferred or from which terminal TE signals are transmitted and/or if the relay RL is able to retransmit signals onto different frequency resources or is able to retransmit signals using different modulation and/or coding scheme than the one used for the transmission of the signals received by the relay RL and/or which protocol is supported by the relay RL.

At next step S703, the processor 300 receives the features of the relay RL.

It has to be noted here that in a variant, the features of the relay RL are received during the identification step S701 of the FIG. 7a. In that variant, the processor 300 starts the algorithm of the FIG. 7b at S752.

At next step S704, the processor 300 checks if the relay RL is in the idle mode.

If the relay is in the idle mode, the processor 300 moves to step S705. Otherwise, the processor 300 moves to step S715.

At step S705, the processor 300 checks if the relay RL needs to be activated.

The relay RL may need to be activated when no other relay RL or few other relays relay signals transferred between at least one terminal TE and the base station BS.

The relay RL may need to be activated if the relay RL has better features than the ones of another relay RL which is currently relaying signals.

If the relay RL needs to be activated, the processor 300 moves to step S706.

Otherwise, the processor 300 returns to step S704.

At step S706, the processor 300 commands the transfer of a paging message to the relay RL. The paging message is transferred to the base station BS which handles the cell in which the relay RL is supposed to be located or to plural base stations BS surrounding the base station BS which handles the cell in which the relay RL is supposed to be located. The base station BS or base stations BS transfer the paging message in their cell or cells.

At next step S707, the processor 300 checks if a response message is received in response to the paging message.

The response message is transferred by the base station BS which manages the cell in which the relay RL is located. The response message is transferred by the base station BS once the base station BS receives a random access message RACH from the relay RL.

If a response message is received, the processor 300 moves to step S709. Otherwise, the processor 300 moves to step S708.

At step S708, the processor 300 commands the deletion of the context of the relay RL.

The context of the relay RL comprises the temporary identifiers allocated to the relay RL, the list of at least one terminal TE determined for the relay RL and may comprise the features of the relay RL.

More generally, the context of the relay RL may comprise all the information related to the relay RL memorized in the management entity ME.

After that, the processor 300 interrupts the present algorithm for the relay RL.

At step S709, the processor 300 detects the reception of a message comprising the identifier TEID allocated to the relay RL and a new UEID allocated to the relay RL. The message is transferred by the base station BS or by the core network devices CN.

It has to be noted here that in a variant, the relay RL transfers the allocated UEID and TEID to the management entity ME.

At next step S710, a connection is established between the relay RL and the management entity ME as it has been disclosed as step S701.

After that, the processor 300 returns to step S704.

At step S715, the processor 300 checks if a handover is needed for the relay RL.

If a handover is needed, the processor 300 moves to step S720. Otherwise, the processor 300 moves to step S730.

At step S720, the processor 300 checks if the relay is going out from the zone handled by the management entity ME.

When the management entity ME is included in a base station BS, the zone handled by the management entity ME is the cell or cells managed by the base station BS.

When the management entity ME manages relays RL included into cells of plural base stations BS, the zone handled by the management entity ME is the cell or cells managed by each base station BS.

If the relay RL is going out from the zone handled by the management entity ME, the processor 300 moves to step S721. Otherwise, the processor 300 moves to step S722.

At step S721, the processor 300 commands the deletion of the context of the relay RL.

In a variant, the processor 300 commands the transfer of the feature of the relay to the management entity ME which handles the area in which the relay RL is now located.

After that, the processor 300 interrupts the present algorithm for the relay RL.

At step S722, the processor commands the deletion of the list of at least one terminal determined for the relay RL.

At next step S723, the processor 300 memorizes the context of the relay RL in combination with the temporary identifier TEID.

After that, the processor 300 returns to step S700.

At step S730, the processor 300 checks if it is time to form a new list.

For example, a new list is formed periodically or when a terminal TE comprised in the list is no more in the cell managed by the base station BS.

If it is time to form a new list, the processor 300 moves to step S731, otherwise, the processor 300 returns to step S704.

At next step S731, the processor 300 forms a list. The step S731 will be described more precisely in reference to the FIG. 7c.

At next step S732, the processor 300 determines if the relay RL has to relay signals transferred between at least one terminal TE and the base station BS.

If the list comprises the identifier of each terminal TE for which signals transferred between the base station BS and the terminal TE have to be relayed, the processor 200 checks if the list is empty. If the list is not empty, the relay RL has to relay signals transferred between at least one terminal TE and the base station BS.

If the list of at least one terminal TE comprises the identifier of each terminal TE for which the relaying of signals transferred between the base station BS and the terminal TE has to be interrupted, the processor 300 removes each identifier comprised in the list to a memorized list of terminal TE for which signals transferred between the at least one identified terminal TE and the base station BS had to be relayed by the relay RL and checks if the modified memorized list is empty. If the modified memorized list is not empty, the relay RL has to relay signals transferred between at least one terminal TE and the base station BS.

If the relay RL has to relay signals transferred between at least one terminal TE and the base station BS, the processor 300 moves to step S740. Otherwise, the processor 300 moves to step S733.

It has to be noted here that in a variant, the list of at least one terminal is determined according to the quality of the link between the relay RL and the base station BS.

If the quality of the link between the relay RL and the base station BS is below a given threshold, the processor 300 may decide that the relay RL has to interrupt the relay of signals. The formed list comprises then the identifiers of terminals which reflect that the relay RL has to stop to relay signals.

At step S733, the processor 300 checks if the relay RL has to be switched in the idle mode.

For example, a relay has to be switched in the idle mode when plural consecutive lists determined at step S731 reflect that the relay RL has to stop to relay signals.

If the relay RL has to be switched in the idle mode, the processor 300 moves to step S734. Otherwise, the processor 300 returns to step S704.

In the case the processor 300 returns to step S704, the relay RL is in the active mode. In the active mode, the connection is maintained between the relay RL and the management entity ME but the relay RL doesn't relay signals transferred between the base station BS and at least one terminal TE.

At step S734, the processor 300 commands the transfer of an idle command to the relay RL.

In the idle mode, the relay RL stops to relay signals and interrupts the transmission of some signals like the one used for localizing a terminal TE.

At next step S735, the processor 300 memorizes the identifier TEID, the context of the relay RL in combination with information indicating that the device to which the TEID is allocated is a relay RL in idle mode.

At the same step, the connection between the relay RL and the management entity ME is released.

After that, the processor 300 returns to step S704.

At next step S740, the processor 300 checks if the relay RL is already in the relay mode.

If the relay RL is already in the relay mode, the processor 300 moves to step S742. Otherwise, the processor 300 moves to step S741.

At step S741, the processor 300 commands the transfer of relay command to the relay RL through the connection.

At step S742, the processor 300 commands the transfer to the relay RL of the list.

At next step S743, the processor 300 memorizes the couple of identifiers UEID and TEID in combination with information indicating that the device to which the TEID is allocated is a relay RL in relay mode.

After that, the processor 300 returns to step S704.

At step S750 of the FIG. 7c, the processor 300 commands the transfer of a sounding request to the relay RL.

At next step S751, the processor 300 detects the reception of information identifying the M Physical Resource Blocks PRB on which the received signals power strength measured by the relay RL are the M highest.

In a variant, the processor 300 detects the reception of M identifiers of terminals TE for which the received signals power strength measured by the relay RL are the M highest. In such variant, the processor 300 moves from step S751 to S754.

At next step S752, the processor 300 commands the transfer to the base station BS of a scheduler information request.

The scheduler information request may be a request for obtaining the identifiers of the terminals TE to which the physical resource blocks identified in the information received at step S751 are allocated.

The scheduler information request may be a request for obtaining the identifiers of the terminals TE to which physical resource blocks have been allocated by the base station BS.

The scheduler information request may be a request for obtaining the identifiers of the terminals TE to which a part of physical resource blocks identified in the information received at step S751 are allocated.

At next step S753, the processor 300 obtains the identifiers of the terminals TE to which the physical resource blocks identified in the information received at step S753 are allocated.

The processor 300 obtains the identifiers from at least a message transferred by the base station BS in response to the scheduler information request.

At next step S754, the processor 300 obtains the identifiers of the terminals TE handled by the base station BS which are identified as having a low throughput in comparison with others.

The processor 300 obtains the identifiers of the terminals TE handled by the base station BS which are identified as having a low throughput from at least a message transferred by the base station BS.

At next step S755, the processor 300 determines the list.

For example, the list is determined by selecting the identifiers of terminals TE which are identifiers obtained at step S753 or which are identifiers received at step S753 and S754 and/or the identifiers of the terminals TE which have a position close to the position of the relay RL.

In another example, the list is determined by selecting the identifiers of terminals TE which are identifiers received at step S753 and which were not comprised in a previous list or which are identifiers received at step S753 and S754 and which were not comprised in a memorized list and/or the identifiers of the terminals TE which have a position close to the position of the relay RL and which were not memorized in a previous list.

In another example, the list is determined by selecting the identifiers of terminals TE which were comprised in a previous list and which are not identified at step S753 or the identifiers of terminals TE which were comprised in a memorized list and which are no more identified at step S753 and S754 and/or the identifiers of the terminals TE which have a position which becomes far from the position of the relay RL.

Naturally, many modifications can be made to the embodiments of the invention described above without departing from the scope of the present invention.

The invention claimed is:

1. A method, implemented on a communication system, for identifying at least one terminal for which signals transferred between the at least one terminal and a base station of a wireless cellular telecommunication network have to be relayed by a relay device, the base station providing a random access channel enabling a terminal to notify to the base station the presence of the terminal by transferring a random access signal to the base station, the method comprising:

transferring, by the relay device, a random access signal to the base station over the random access channel to notify the base station of the presence of the relay device, wherein the relay device is initially considered by the base station to be a new terminal in an area managed by the base station after receiving the random access signal;

informing, by the relay device, the base station, after a response to the transferred random access signal is received, that the relay device is a relay that is configured to relay signals between the base station and at least one terminal, for authentication as the relay that is configured to relay signals between the base station and at least one terminal by a core network device;

relaying, by the relay device, signals between at least one terminal and the base station.

2. The method according to claim 1, further comprising: receiving a message requesting the relay device to switch in an idle mode; and interrupting the relay of the signals transferred between each identified terminal and the base station.

3. The method according to claim 2, further comprising, executed prior to the receiving the message, transferring information representative of measurement of signals transferred by at least one terminal to the base station which handles the terminal.

4. The method according to claim 3, wherein information representative of measurement of signals transferred by at least one terminal are information identifying the resource blocks of at least one channel between the base station and the terminal for which the relay device measures the highest receive signals power strength.

5. The method according to the claim 4, wherein a management entity manages the relay device located in the area managed by the base station.

6. The method according to the claim 5, further comprising:
receiving a list;
identifying, from the received list, at least one terminal for which signals transferred between the at least one identified terminal and the base station have to be relayed by the relay device,
wherein the management entity receives the information identifying the resource blocks, and the method further comprising, executed by the management entity:
obtaining, from the base station, at least one identifier of the terminal to which the identified resource blocks are allocated; and
determining, from the at least one obtained identifier of terminal, the list of at least one terminal.

7. The method according to claim 6, further comprising, executed by the management entity, obtaining, from the base station, at least one identifier of the terminal for which the transmission quality between the terminal and the base station is below a given threshold, and the list of at least one terminal is further determined from the at least one obtained identifier of terminal for which the transmission quality between the terminal and the base station is below the given threshold.

8. The method according to claim 6, wherein the message and/or the information transferred between the management entity and the relay device are transferred via a radio interface of the base station.

9. The method according to claim 5, further comprising:
receiving a list;
identifying, from the received list, at least one terminal for which signals transferred between the at least one identified terminal and the base station have to be relayed by the relay device,
the method further comprising, executed by the management entity, receiving information representative of measurement of signals transferred between the base station and the relay device, and the list of at least one terminal is further determined from information representative of measurement of signals transferred between the base station and the relay device.

10. The method according to claim 5, further comprising, executed by the management entity, transferring a message requesting the relay device to stop to transfer signals transferred between the at least one terminal and the base station which handles the terminal if signals do not need to be relayed.

11. The method according to claim 10, further comprising, executed by the management entity, transferring a paging message to the relay device.

12. The method according to claim 1, wherein the base station allocates an identifier to the relay device, the identifier being selected among identifiers to be allocated to terminals.

13. The method according to claim 1, further comprising:
receiving a list;
identifying, from the received list, at least one terminal for which signals transferred between the at least one identified terminal and the base station have to be relayed by the relay device,
wherein the at least one identified terminal is a terminal identified in the received list.

14. The method according to claim 1, wherein the relay device identifies at least one terminal for which signals transferred between the at least one terminal and the base station have to be relayed by the relay device.

15. The method according to claim 14, wherein the relay device receives at least one identifier of a terminal, the identified terminal being identified from the at least one received identifier.

16. A relay device of a wireless cellular telecommunication network in which the relay device is configured to relay signals transferred between at least one terminal and a base station, and the base station provides a random access channel enabling a terminal to notify to the base station the presence of the terminal by transferring a random access signal to the base station, the relay device comprising:
means for transferring a random access signal to the base station over the random access channel to notify the base station of the presence of the relay device, wherein the relay device is initially considered by the base station to be a new terminal in an area managed by the base station after receiving the random access signal;
means for informing the base station, after a response to the transferred random access signal is received, that the relay device is a relay that is configured to relay signals between the base station and at least one terminal, for authentication as the relay that is configured to relay signals between the base station and at least one terminal by a core network device; and
means for relaying signals between at least one terminal and the base station.

17. A non-transitory computer readable medium including computer executable instructions or portions of code for causing a relay device of a wireless cellular telecommunication network, in which the relay device is configured to relay signals transferred between at least one terminal and a base station and the base station provides a random access channel enabling a terminal to notify to the base station the presence of the terminal by transferring a random access signal to the base station, to perform a method comprising:
transferring, by the relay device, a random access signal to the base station over the random access channel to notify the base station of the presence of the relay device, wherein the relay device is initially considered by the base station to be a new terminal in an area managed by the base station after receiving the random access signal;
informing, by the relay device, the base station, after a response to the transferred random access signal is received, that the relay device is a relay that is configured to relay signals between the base station and at least one terminal, for authentication as the relay that is configured to relay signals between the base station and at least one terminal by a core network device; and
relaying, by the relay device, signals between at least one terminal and the base station.

18. A method, implemented on a communication system, for notifying the presence of a relay device to a base station, the relay device being able to relay signals transferred between at least one terminal and the base station of a wireless cellular telecommunication network, the base station providing a random access channel enabling a terminal to notify to the base station the presence of the terminal by transferring a random access signal to the base station, the method comprising:
transferring, by the relay device, a random access signal to the base station over the random access channel to notify the base station of the presence of the relay device, wherein the relay device is initially considered by the base station to be a new terminal in an area managed by the base station after receiving the random access signal; and informing, by the relay device, the base station, after a response to the transferred random access signal is received, that the relay device is a relay that is configured to relay signals between the base station and at least one terminal, for authentication as the relay that is configured to relay signals between the base station and at least one terminal by a core network device.

19. A method, implemented on a communication system, for notifying the presence of a relay device to a base station, the relay device being able to relay signals transferred between at least one terminal and the base station of a wireless cellular telecommunication network, the base station providing a random access channel enabling a terminal to notify to the base station the presence of the terminal by transferring a random access signal to the base station, the method comprising:

receiving, by the base station, a random access signal from the relay device over the random access channel to notify the base station of the presence of the relay device, wherein the relay device is initially considered by the base station to be a new terminal in an area managed by the base station after receiving the random access signal; and receiving, by the base station, after a response to the transferred random access signal is transferred, information from the relay device notifying that the relay device is a relay that is configured to relay signals between the base station and at least one terminal, for authentication as the relay that is configured to relay signals between the base station and at least one terminal by a core network device.

* * * * *